R. GOLDSTRAW.
TEAT CUP SUPPORT TO FACILITATE MILKING.
APPLICATION FILED MAR. 11, 1912.
1,037,897.
Patented Sept. 10, 1912.
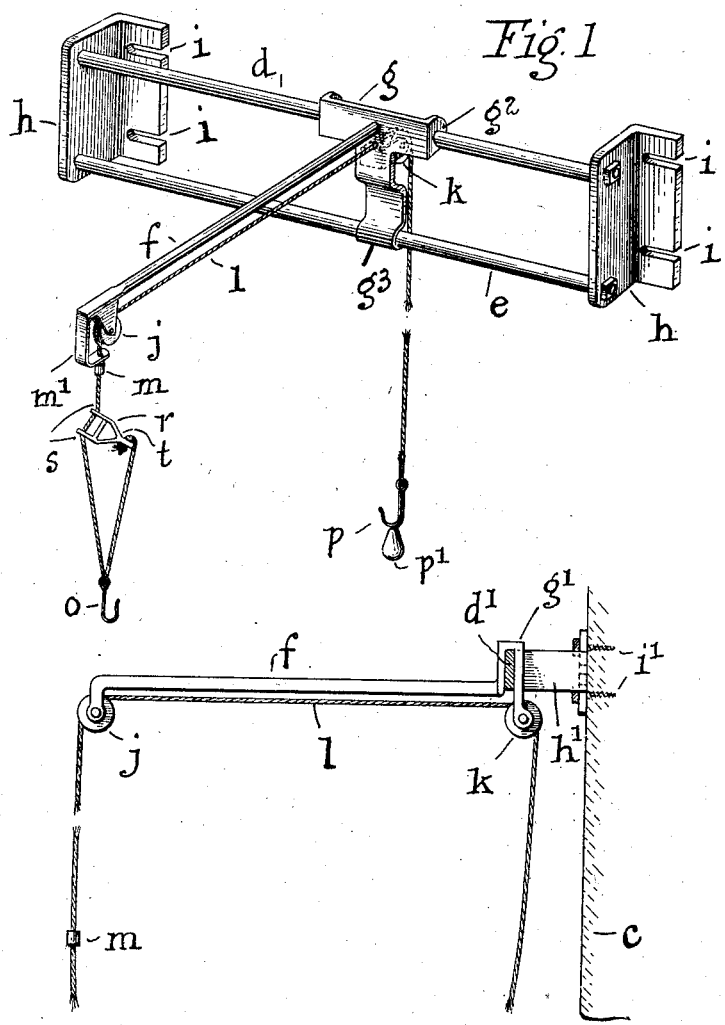
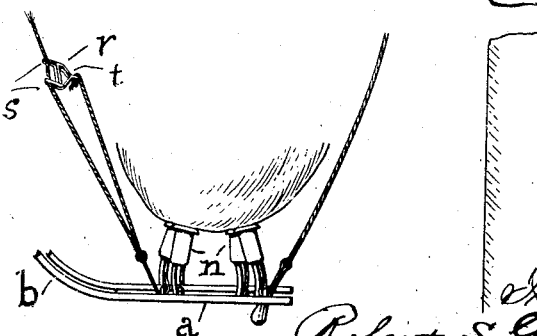

UNITED STATES PATENT OFFICE.

ROBERT STANISLAUS GOLDSTRAW, OF CAMPERDOWN, VICTORIA, AUSTRALIA.

TEAT-CUP SUPPORT TO FACILITATE MILKING.

1,037,897.  Specification of Letters Patent.  Patented Sept. 10, 1912.

Application filed March 11, 1912. Serial No. 682,980.

*To all whom it may concern:*

Be it known that I, ROBERT STANISLAUS GOLDSTRAW, a subject of the King of Great Britain and Ireland, &c., residing at Camperdown, in the State of Victoria, Commonwealth of Australia, have invented certain new and useful Improvements in Teat-Cup Supports to Facilitate Milking; and I do hereby declare the following to be a full, clear, and exact description of the invention, such as will enable others skilled in the art to which it appertains to make and use the same.

This invention provides adjustable cord devices, for preventing the falling off of milking machine teat cups, while milking is in progress, by affording them support in their working positions under an udder.

A cord has been proposed or tried connected near the cups at one end only, but it has not proved satisfactory, there being nevertheless a falling off of various cups. When the existing cups fall off prematurely, they must either be replaced by an attendant whose duty it is to watch the milking, or the milking from the teats affected must be finished by hand. According to my arrangement the tendency for teat cups to be pulled off to one side, in the direction of the tubes which connect to the milking machine is provided against. The fact that cows vary in bodily length and in the height of their teats from the ground is provided for by my appliance.

Any suitable cups can be used and supported by my devices which are independent thereof and removable at will. During milking some cows twitch their bodies or kick, and are thus apt to disengage the cups. Some existing cups do on some teats hold well, but the trouble that occurs is that a good many teats are of such varying shapes and sizes that the existing cups do not hold on and so require assistance. There are, again, teat cups which in holding on injure the teats, but, with my invention, that will not be excusable. With my device the cups are adjusted on the teats in a position suitable for comfortable milking, and the frame or arrangement of tubes sometimes called a claw, which is below the teat cups, is engaged by hooks connected to an adjustable cord.

It is usual for milking purposes to stand cows in stalls divided by partitions, two cows being put in each stall. My appliance has an upper support to be secured to a stall partition or wall inside of where a cow will stand. An arm, which projects from the said support over the cow, is adjustable longitudinally so that it shall be located immediately above that part of the cow's back which is over its udder.

In the accompanying drawings this invention is illustrated, but minor details may be varied without departing from what I claim.

Figure 1 is a perspective view of the appliance with its cord ends hanging free, part of the cord being broken away. Fig. 2 is a side elevation of a modification, showing supported teat cups.

The claw or framing to which the teat cup is connected is marked $a$, and from this suitable tubing $b$ extends to other portions of the milking machine. To opposite ends of claw or the like $a$, I connect hooks described later.

$c$ shows a stall partition or the like, to which is attached a support consisting of one or more rails, as $d$, $e$, Fig. 1, or $d^1$ Fig. 2, as a support and guide for a slidable saddle $g$ Fig. 1 or $g^1$ Fig. 2 to which an outwardly projecting arm $f$ is secured.

In Fig. 2 the saddle is integral with arm $f$. Supports for the rail ends are fixed to partitions $c$ as brackets $h$ which may be laterally adjustable by means of slots $i$ to receive screws or the like; or the bar $d^1$ may have bent ends $h^1$ integral therewith, $i^1$ indicating screws. The saddle or slide member $g$ is shown with its top pivoted to rail $d$ which passes through holes $g^2$ in the saddle which has a base $g^3$ resting against rail $e$. A pair of suitable pulleys as $j$ and $k$ supported by arm $f$ are engaged by a cord or the like $l$ on which is an enlargement $m$, preferably of lead squeezed on, to prevent the cord being carried too far over the pulley $j$. The enlargement can not pass a stop $m^1$ through which the cord passes in Fig. 1.

The teat cups $n$ when set to the cow, will be supported at each side as by hooks $o$, $p$ or the like at each end of my cord. The inner hook $p$ is provided with a small weight $p^1$, so that this hook will automatically disengage when the other hook is released from claw $a$ at the termination of the milking. The weight must on no account however be so great as to be a counterbalance to the weight of the claw and milking cups as in that case the hook *p* would fall off when it would be important to keep it on. When putting the hooks on, all slackness is to be taken up by means of a sliding cord grip *r* having eyes *s* at one end, through which the cord at the side of the cow passes, and there is also an eye *t* at the other end of the grip body to which the cord end is fastened. There may be any suitable substitute for the said eyes. The weight of the cord and hook below the grip causes the grip body which stands out laterally from the cord to sag as in Fig. 1 and so the cord is bent as illustrated and the grip keeps the position it is adjusted in to remove slackness. When out of use the cord may be lifted up and supported out of the way on one or both sides, to allow a clear passage for the cow to enter the stall. The cord is usually hung up also before the cow leaves.

What I claim as my invention is:—

1. In a device of the character described, the combination with a support, of a cord carried thereby, hooks at the inner and outer ends of said cord, a weight at the inner end of the cord, and a claw adapted to be engaged by the hooks as described.

2. In a device of the character described, the combination with a support, of a member having a slidable connection with said support, pulleys carried by said slidable member, a cord passing over said pulleys, hooks at the inner and outer ends of the cord, a weight carried by the hook at the inner end of the cord, a stop on the outer portion of the cord, a claw adapted to be engaged by the hooks, and means for taking up slackness of the said outer portion of the cord when the hooks are set in supporting position.

3. In a device of the character described, the combination with a supporting rail, of a member slidably mounted on the rail and projecting outwardly therefrom, pulleys carried by said slidable member, a cord passing over said pulleys, hooks at the inner and outer ends of the cord, a weight carried by the hook at the inner end of the cord, a stop on the outer portion of the cord, a claw adapted to be engaged by the hooks, and means for taking up slackness of the said outer portion of the cord when the hooks are set in supporting position.

4. In a device of the character described, the combination with a cord, an adjustable carrier therefor, hooks at the ends of the cord, and means for taking up slackness of the cord.

5. In a device of the character described, the combination with a cord, an adjustable carrier therefor, hooks at the ends of the cord and means for taking up slackness of the cord comprising a cord grip having eyes at one end through which the cord passes and an eye at the other end to which the cord end is fastened.

In witness whereof I have hereunto set my hand in the presence of two witnesses.

ROBERT STANISLAUS GOLDSTRAW.

Witnesses:
WILLIAM L. BEATTIE,
BEATRICE M. LOWE.